April 21, 1942.   J. F. NEUMUELLER ET AL   2,280,297
METHOD OF TESTING EYES
Original Filed Aug. 19, 1936
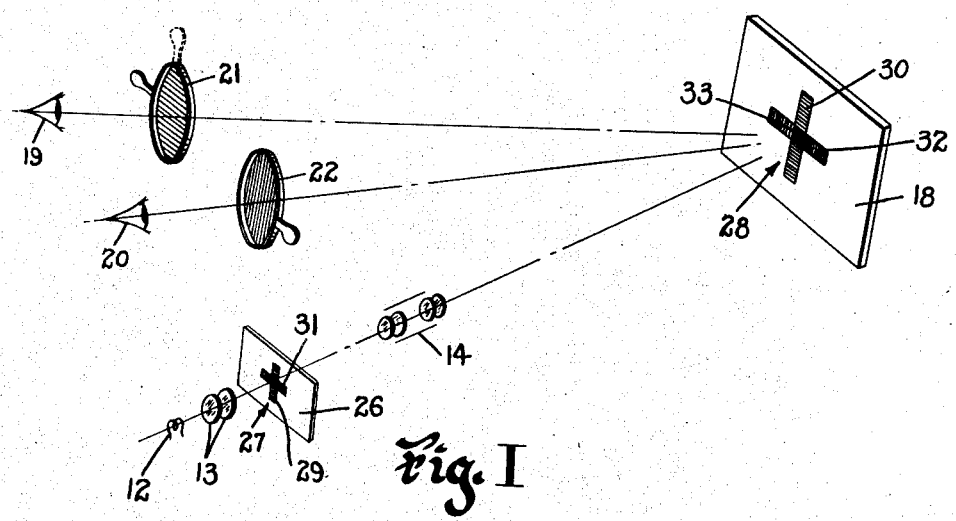
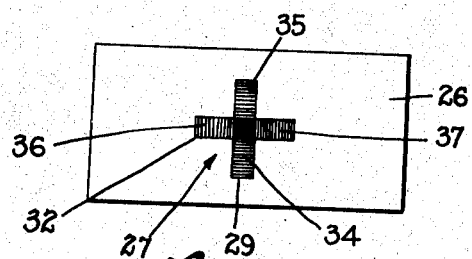
Fig. II
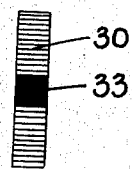
Fig. III
Fig. IV
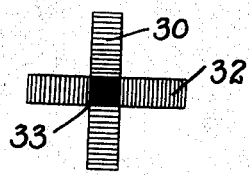
Fig. V
INVENTOR.
JULIUS F. NEUMUELLER
JAMES Y. TAYLOR
BY Harry H. Styll
ATTORNEY.

Patented Apr. 21, 1942

2,280,297

UNITED STATES PATENT OFFICE 2,280,297

METHOD OF TESTING EYES

Julius F. Neumueller, Webster, Mass., and James Y. Taylor, Brownwood, Tex., assignors to American Optical Company, Southbridge, Mass., a voluntary association of Massachusetts Original application August 19, 1936, Serial No. 96,826. Divided and this application January 5, 1940, Serial No. 312,570

1 Claim. (Cl. 88—20)

This invention relates to improved means and method of testing eyes.

This application is a division of our co-pending application Serial No. 96,826, filed August 19, 1936.

One of the principal objects of the invention is to provide novel means and method of testing sight, especially where malingering is suspected.

Another object is to provide means at a suitable distance from the eyes which may be rendered visible to one or the other of the eyes separately, or to both eyes simultaneously.

Another object is to provide a projector having means associated therewith for projecting an image by means of light rays polarized in a given plane, and to provide means adapted to be associated with the eyes, one of which is polarized in the same plane as the projected image and will permit vision of the test means, and the other polarized in a plane substantially normal to the first means and which will render the test means invisible to said eye.

Another object of the invention is to provide an attachment which may be utilized with standard projectors of the type now in commercial use.

Another object of the invention is to provide a smooth image receiving screen within the field of vision of the subject upon which the test image may be projected so that the polarized light utilized in producing the test image will not become depolarized.

Other objects and advantages of the invention will become apparent from the following description taken in connection with the accompanying drawing and it will be understood that many changes may be made in the arrangement of parts, details of construction and method shown and described without departing from the spirit of the invention as set forth in the accompanying claim. We, therefore, do not wish to be limited to the exact arrangement of parts, details of construction, and method shown and described as the preferred form only has been shown by way of illustration.

Referring to the drawing:

Fig. I is a diagrammatic perspective view illustrating the means and method of performing the test;

Fig. II is a face view of the image forming slide of the device shown in Fig. I;

Figs. III, IV and V are diagrammatic views showing the images presented to each eye and how they appear when seen binocularly.

The device embodying the invention is adapted particularly for use in testing the eyes of individuals suspected of malingering or pretending blindness or partial blindness of one or the other of the eyes, as for instance in cases of individuals claiming compensation for accidents, exemption from military service, etc., or in any instance where the replies of the subject as to his vision cannot be relied upon.

It is therefore essential that such tests be made by means or methods whereby the visual acuity of each respective eye of the subject may be separately determined without direct knowledge on the part of the subject as to which eye is being tested.

Several devices have been utilized in the past for accomplishing this result but such devices have not been wholly practical because it has been difficult to keep the subject from knowing which eye was being tested. It is, therefore, one of the primary objects of this invention to overcome the difficulties of the prior art and to provide means whereby the eyes of individuals may be tested separately or simultaneously without knowledge on the part of the subject as to which of the eyes is seeing or if both eyes are seeing.

Referring more particularly to the drawing wherein like characters of reference designate like parts throughout the several views, the device embodying the invention comprises, as shown in Figs. I to V inclusive, a slide 26 provided with means 27 for producing a projected cross 28 on a screen 8. The slide 26 is mounted within a suitable support in a projecting apparatus which, as shown diagrammatically in Fig. I, comprises a source of illumination 12, condensing lenses 13, and projection lenses 14 of the usual type.

The means 27, over the portion 29 thereof forming the vertical bar 30 of the cross, is provided with polarizing material having its axis of polarization extending in a horizontal plane so as to cause the bar portion 30 to be projected on to the screen by polarized light whose axis extends in a horizontal plane. The portion 31 of the means 27 forming the horizontal bar 32 of the cross is provided with polarizing material whose axis of polarization extends vertically so as to cause the light producing the bar 32 to have its axis of polarization extending vertically. The central portion 33 of the cross is square in outline and is produced by non-polarized light.

Suitable polarizing disks 21 and 22 are used in connection with the above arrangement. The polarizing disks 21 and 22 are placed before the eyes of the subject. These polarizing disks are adapted to be supported by a trial frame or other means known in the art.

The polarizing disk 22 positioned before the eye 20 has its axis of polarization extending vertically, while the polarizing disk 21 before the eye 19 has its axis of polarization extending horizontally.

It is to be understood that if desired the axis of the disks 21 and 22 may be shifted, care being taken that the respective axes are at 90 degrees or perpendicular to each other.

It will be noted, with the above arrangement, and with the polarizing disks 21 and 22 in position before their respective eyes as illustrated in Fig. I, the vertical bar 30 only will be visible to the eye 19 or left eye of the individual, and the horizontal bar 32 will be visible only to the eye 20 or right eye of the individual. This is due to the fact that the axis of polarization of the disk 21 extends in a horizontal direction and transmits only the polarized light of the bar 30 while the axis of polarization of the disk 22 extends in a vertical direction and transmits only the polarized light of the bar 32.

Assuming both eyes are normal, the image viewed through the disks 21 and 22 will be seen as a cross, such as illustrated in Fig. V. This is brought about by the fusional faculties of the eyes which cause the central squares 33 of the respective bars to move into superimposed relation with each other.

If, however, the subject reports that he sees only the vertically extending line or bar 30, as illustrated in Fig. II, the operator knows immediately that the right eye is deficient or blind. If on the other hand, the subject reports that he sees only the horizontally extending bar 32 as illustrated in Fig. IV, the operator immediatley knows what the left eye is deficient or blind.

This arrangement, therefore, enables the operator to immediately know whether or not one or the other of the eyes is deficient or blind without the necessity of having to adjust any of the working parts of the device.

The portion 29 of the image forming means 27 is plane polarized in the horizontal direction preferably by securing sheets of polarizing material 34 and 35 having a plurality of minute crystals oriented therein over the respective sections of the bar. Similar portions 36 and 37 are secured over the respective portions of the bar 32 with their crystals oriented in a vertical direction. In any event, the axis of polarization of the bar should be in normal relation to each other and the polarizing disks 21 and 22 so adjusted that their axes of polarization are parallel with the respective bars.

It is to be understood that although we have illustrated a cross type image, several other designs of image might be used, as for example, a word which when divided into different groups, will spell two or more separate words. Likewise, two separate letters, such as F formed by plane polarized light in one direction and an L formed by plane polarized light in a direction substantially normal to the axis of polarization of the light producing the image F might be used so that when viewed binocularly, the test image will be seen as an E, if the eyes are normal. If one eye is blind or partially blind, one letter, say F, will be distinguishable and if the other eye is the deficient eye, only the L will be visible. By knowing which of the two eyes should see the corresponding letters, the operator immediately knows which of the two eyes is deficient.

It is also to be understood that various combinations of the above might be employed.

The polarizing means referred to throughout the specification as being formed of sheet material having a plurality of minute crystals oriented therein, is preferably formed of a transparent supporting medium in which the crystals are placed when the medium is in plastic or liquid state. The crystals are oriented and are held in said oriented relation until the material hardens. During the orienting of the crystals, the material is made into sheet form and is allowed to harden in this form and may thereafter be cut into the size and shape desired.

From the foregoing description it will be seen that simple, efficient and economical means and method have been provided for accomplishing all the objects and advantages of the invention, particularly that of producing malingering test means which may be quickly and easily manipulated.

Having described our invention, we claim:

The method of performing a malingering test comprising placing a polarizing element in front of each respective eye of the individual under test with the axes of polarization of said elements being disposed in substantially normal relation with each other, exhibiting to the eyes, through their respective polarizing elements, a test member of a given form character having in part a portion produced by non-polarized light and having additional components, one produced by light polarized in a direction substantially parallel with one of the polarizing elements in front of one eye and another by light polarized in a direction substantially parallel to the axes of polarization of the element before the other eye causing each component to be visible and viewed monocularly by the respective eyes with the portion produced by non-polarized light being singularly binocularly visible by said eyes and causing the monocularly visible components to combine with each other to produce, to normal eyes, a form character simulating the form character actually exhibited to the eyes through fusion of the portions thereof produced by non-polarized light and to an individual having a deficient eye causing said component visible to the good eye to be of different distinguishable form character from that of the original test character whereby a true determination of the conditions of the eyes of the individual under test, by comparison of the report of said individual as to the nature of the visible test character with the true nature of the actual test character exhibited, can be made.

JULIUS F. NEUMUELLER.
JAMES Y. TAYLOR.